United States Patent [19]

Vaughn

[11] Patent Number: 4,590,825
[45] Date of Patent: May 27, 1986

[54] HIGH TORQUE FASTENER AND DRIVING TOOL

[76] Inventor: John Vaughn, P.O. Box 3368, Granada Hills, Calif. 91344

[21] Appl. No.: 659,715

[22] Filed: Oct. 11, 1984

Related U.S. Application Data

[63] Continuation-in-part of Ser. No. 492,164, May 6, 1983, Pat. No. 4,497,225.

[51] Int. Cl.⁴ .............................................. B25B 15/02
[52] U.S. Cl. ...................................................... 81/451
[58] Field of Search ................ 81/436, 438, 461, 439, 81/451

[56] References Cited

U.S. PATENT DOCUMENTS

| | | |
|---|---|---|
| 179,695 | 7/1876 | Frearson . |
| 308,247 | 11/1884 | Frearson . |
| 1,797,390 | 3/1931 | Wood . |
| 2,046,837 | 7/1936 | Phillips . |
| 2,046,840 | 7/1936 | Phillips et al. . |
| 2,140,449 | 12/1938 | Brown . |
| 2,142,185 | 1/1939 | Fieg . |
| 2,160,244 | 5/1939 | West ...................... 81/436 |
| 2,235,781 | 3/1941 | Werme . |
| 2,268,515 | 12/1941 | Olson . |
| 2,366,682 | 1/1945 | West et al. . |
| 2,389,129 | 11/1945 | Bishop . |
| 2,402,342 | 6/1946 | Phillips . |
| 2,445,525 | 7/1948 | Gulden . |
| 2,601,453 | 6/1952 | Phipard, Jr. . |
| 2,677,985 | 5/1954 | Vaughn . |
| 2,745,120 | 5/1956 | Vaughn . |
| 2,764,197 | 9/1956 | Torreson . |
| 2,808,087 | 10/1957 | Vaughn . |
| 2,864,418 | 12/1958 | Vaughn . |
| 2,949,949 | 8/1960 | Vaughn . |
| 2,954,719 | 10/1960 | Vaughn . |
| 2,994,354 | 8/1961 | Vaughn . |
| 3,060,565 | 10/1962 | Vaughn . |
| 3,103,675 | 9/1963 | Vaughn . |
| 3,354,481 | 11/1967 | Bergere . |
| 3,388,411 | 6/1968 | Vaughn . |
| 3,453,972 | 7/1969 | Vaughn . |
| 3,540,342 | 11/1970 | Vaughn . |
| 3,575,080 | 4/1971 | Hanney . |
| 3,913,647 | 10/1975 | Arnn . |
| 4,033,003 | 7/1977 | Marroquin . |
| 4,084,478 | 4/1978 | Simmons . |
| 4,160,300 | 7/1979 | Marroquin . |

FOREIGN PATENT DOCUMENTS 1078229  5/1980  Canada .................................. 81/436

Primary Examiner—Roscoe V. Parker
Attorney, Agent, or Firm—Pastoriza, Kelly & Lowry

[57] ABSTRACT

An improved high torque fastener is provided of the type having a screw head with a generally bow-tie shaped driving slot formed with undercut side walls and an arcuately concave bottom wall for reception of an arcuately convex blade of a driving tool for relatively high torque transfer therebetween. The improved fastener includes a conical recess positioned centrally along the driving slot with a base diameter substantially greater than the width of the slot thereat and an apex disposed substantially below the slot bottom wall. The improved driving tool includes a conical tip formed centrally on an arcuately convex blade with a substantially pointed end projecting beyond the blade, wherein the blade and tip provide geometric surfaces for facilitated and aligned centering and coaxial substantial mating reception into the fastener driving slot and conical recess. Apparatus for forming the improved fastener is also disclosed.

7 Claims, 14 Drawing Figures

U.S. Patent  May 27, 1986  Sheet 1 of 3  4,590,825
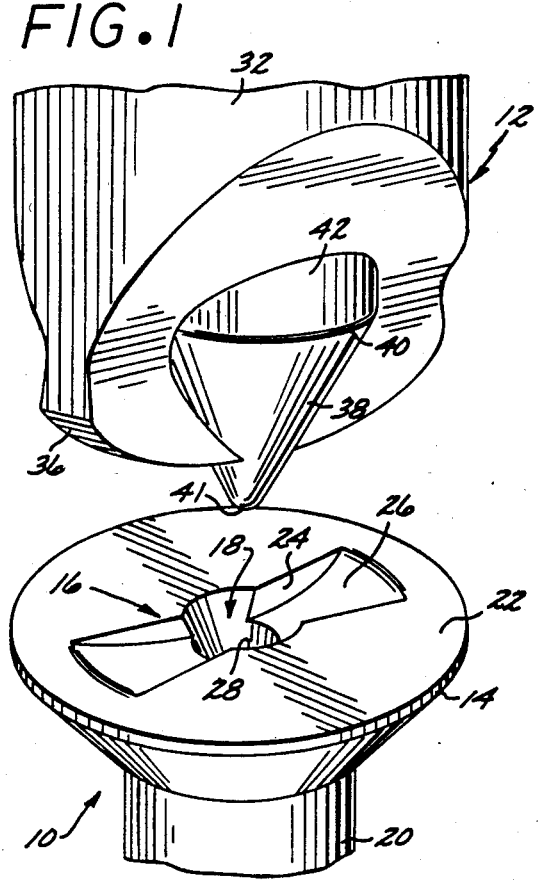
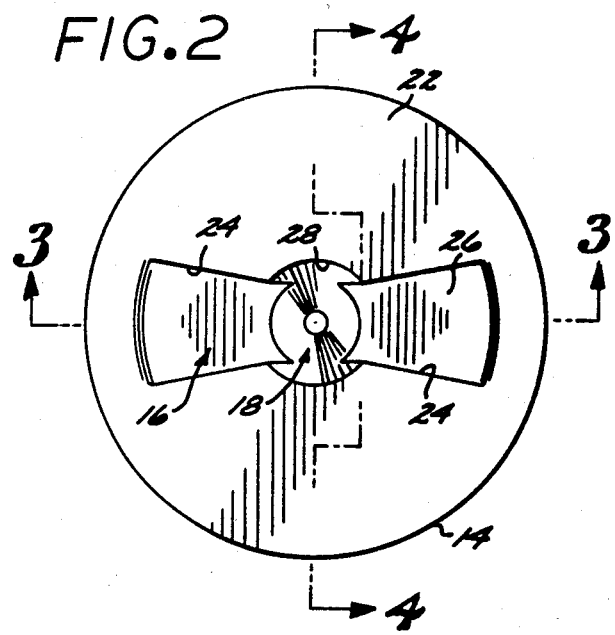
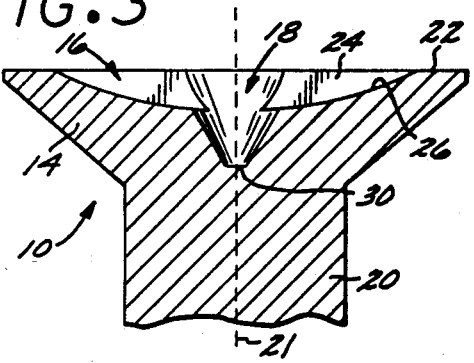
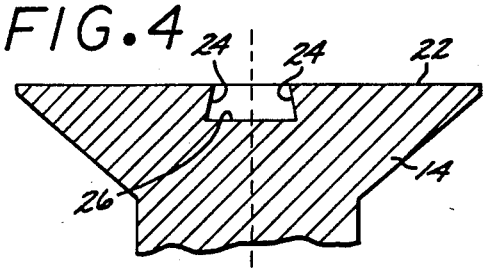
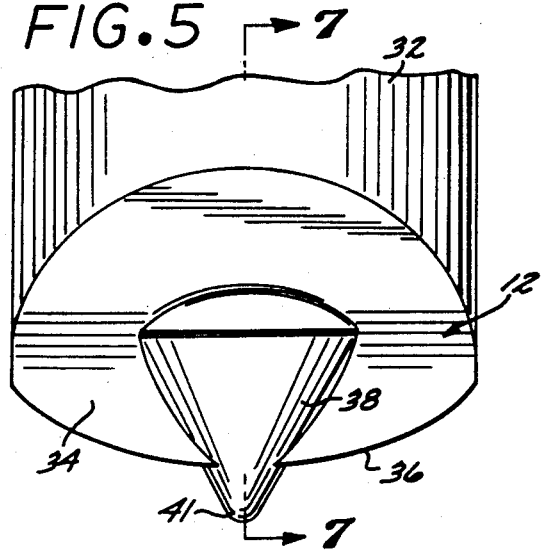
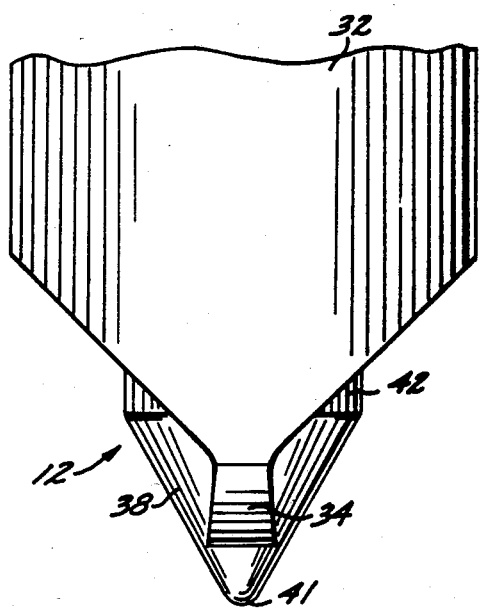

HIGH TORQUE FASTENER AND DRIVING TOOL

BACKGROUND OF THE INVENTION

This is a continuation-in-part of prior copending application Ser. No. 492,164, filed May 6, 1983 and now U.S. Pat. No. 4,497,225.

This invention relates generally to so-called high torque fasteners particularly of the type described in U.S. Pat. Nos. 2,677,985 and 3,540,342. More specifically, this invention relates to an improved high torque fastener and an improved driving tool therefor, wherein the fastener and tool are designed for facilitated and positive engagement and rotational alignment of the tool with the fastener.

Threaded fasteners in general are well known to include a threaded shank joined integrally at one end with a screwhead shaped for engagement by an appropriate driving tool. For example, fasteners, such as screws, are used widely wherein the screw has a slotted head for reception of a blade or blades of a driving tool, such as a standard blade or Phillips-type screwdriver or the like. The specific configurations of the fastener head and driving tool can vary widely, particularly with fasteners designed for conventional use requiring relatively low levels of driving torque for installation. However, in a few specialized environments, such as a variety of military and aerospace applications, the fastener head and driving tool are carefully geometried to accommodate relatively high driving torques during installation thereby achieving higher tensile preloads or fastening forces. Such specialized fasteners are referred to commonly as "high torque" fasteners.

One particularly well-known high torque fastener design is shown and described in U.S. Pat. No. 2,677,985 wherein a fastener head is provided with a generally bow-tie shaped driving slot defined by an arcuately concave bottom wall separating slightly undercut side walls. This driving slot is adapted for reception and engagement by a driving tool blade having an arcuately convex lower surface generally matching the curvature of the slot bottom wall. Upon rotation of the driving tool, the undercut geometry of the slot side walls cooperates with the driving tool blade to accommodate relatively high torque transfer between the driving tool and the fastener head.

While the fastener slot and tool blade geometry described in said U.S. Pat. No. 2,677,985 has proven particularly successful in accommodating the desired high torque driving forces, major difficulties are encountered particularly with respect to initial engagement and rotational alignment between the relatively blunt arcuate surface of the driving tool blade and the relatively shallow slot in the fastener head. Such initial engagement and rotational alignment is especially difficult with relatively small fasteners or in situations where the fastener is not readily visible to the tool operator, such as when the tool operator is required to reach over or around other structures to install the fastener at a blind position. Improper engagement and noncentered alignment between the driving tool and the fastener head upon initial tool rotation can result in lateral movement or "walking" of the tool across the fastener head and adjacent structural surfaces to damage or otherwise scar those surfaces, particularly when the driving tool is power driven for relatively high speed rotation.

In U.S. Pat. No. 3,540,342, a modified high torque fastener is shown and described intended to reduce incidences of driving tool blade "walking". This modified fastener includes a head having a relatively shallow dimple formed centrally with respect to the driving slot, wherein this dimple has a diameter substantially greater than the slot width and a depth substantially less than the slot depth. This recessed dimple is intended to assist in initial engagement of the driving tool blade centrally relative to the fastener head, thereby to constrain the blade against "walking" upon initial rotation thereof and for seating into the driving slot. While this modified fastener geometry offers some improvements in initial tool-fastener engagement, careful operator attention is still required to insure proper engagement between the tool and fastener head, particularly with fasteners of small sizes. These engagement difficulties are compounded by the blunt shape of the tool blade and the shallow depth of the alignment dimple whereby it is often difficult for the tool operator to recognize alignment by "feel" as opposed to visual inspection. Moreover, the blunt shape of the driving tool blade permits engagement with the blade and fastener rotationally misaligned relative to each other, in which case the driving tool blade tends undesirably to disengage from the fastener and "walk" over adjacent structural surfaces upon initial tool rotation. Further, noncentered rotational misalignment between the tool blade and the fastener results in unbalanced application of driving forces to the fastener head which, in some instances, can result in damage to the fastener.

There exists, therefore, a significant need for an improved high torque fastener and associated driving tool designed for relatively rapid and positive fastener-tool engagement and rotational alignment. The present invention fulfills this need and provides further related advantages.

SUMMARY OF THE INVENTION

In accordance with the invention, an improved high torque fastener and driving tool are provided for facilitated accurate initial engagement and rotational alignment therebetween which may be accomplished by feel in the absence of direct visual inspection. The preferred fastener includes a fastener head having a generally bow-tie shaped slot therein defined by undercut side walls and an arcuately concave bottom wall, and further having a central conical recess extending from a base diameter substantially greater than the central slot width to an apex disposed substantially below the slot bottom wall at a depth generally about twice the maximum depth of the slot. The driving tool includes an arcuately convex blade formed integrally with a central tip of generally conical shape corresponding approximately with the shape of the conical recess in the fastener head and terminating in a substantially pointed end projecting beyond the arcuate surface of the blade.

In use, the substantially pointed end of the conical tip of the tool blade provides a relatively small surface area for initial contact with the fastener head in the event the tip end is engaged with the fastener head at any point other than the conical recess therein. This small contact surface area provides a relatively unstable "feel" which can be readily detected without visual inspection by the tool operator who then readjusts tool position until the blade tip end seats into the conical recess either by direct reception thereinto or by intermediate engagement with the curved bottom wall of the driving slot. The slot bottom wall does not eliminate the unstable "feel" due to the length of the tip end and the corresponding depth of the conical recess, but the arcuate shape of the bottom wall advantageously guides the tip end further downwardly for stable seated reception into the conical recess. This seating of the blade tip into the conical recess holds the tool blade in rotationally centered, coaxial relation with the fastener head, irrespective of angular misalignment between the tool blade and the driving slot, whereupon initial blade rotation is effective to seat the blade into the driving slot for normal high torque driving relation with the fastener head with substantially uniform torque distribution.

In accordance with further related features of the invention, the improved driving tool including the arcuately convex blade and central conical tip is provided in one form at the end of a tool shaft which may be manually or power driven. In an alternative form, the blade comprises a blade wheel having a plurality of conical tips formed about the periphery thereof and removably mounted to the distal end of a tool shaft to accommodate positional adjustment of the blade wheel in accordance with tool wear.

In accordance with still further features of the invention, forming hammers are provided for quickly and easily forming the improved fastener head geometry preferably as a two-step heading process. A first hammer having a protruding and arcuately convex blade portion with parallel side walls, the bases of which are bounded by relatively small recessed channels, and a central conical tip with an apex protruding beyond the curved blade portion surface is provided for impacting a fastener head blank. Such impact forms an arcuate concave slot with a central conical recess in the head blank, wherein relatively small ridges upstand from the upper side margins of the slot. A second hammer having a conical trip is provided for impacting the partically formed blank to redistribute the ridge-forming material downwardly to provide slightly undercut slot side walls.

Other features and advantages of the invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a fragmented perspective view illustrating an improved high torque fastener and driving tool embodying the novel features of the invention;

FIG. 2 is a top plan view of the fastener shown in FIG. 1;

FIG. 3 is a fragmented vertical section taken generally on the line 3—3 of FIG. 2;

FIG. 4 is a fragmented vertical section taken generally on the line 4—4 of FIG. 2;

FIG. 5 is a frangmented side elevation view of the improved driving tool of FIG. 1;

FIG. 6 is a fragmented end elevation view of the improved driving tool;

DETAILED DESCRIPTION OF THE PREFERRED EMBODIMENT

Figure 7:
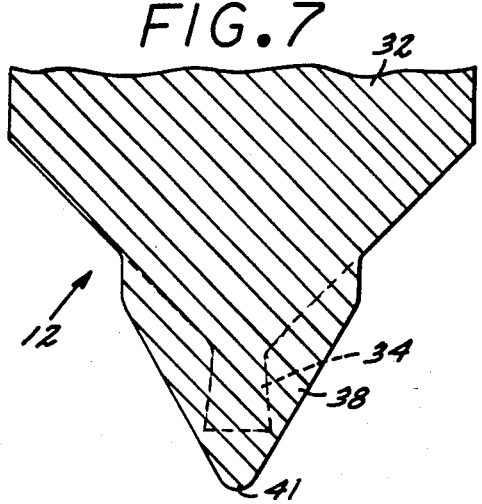
FIG. 7 is a fragmented vertical section taken generally on the line 7—7 of FIG. 5.
Figure 8:
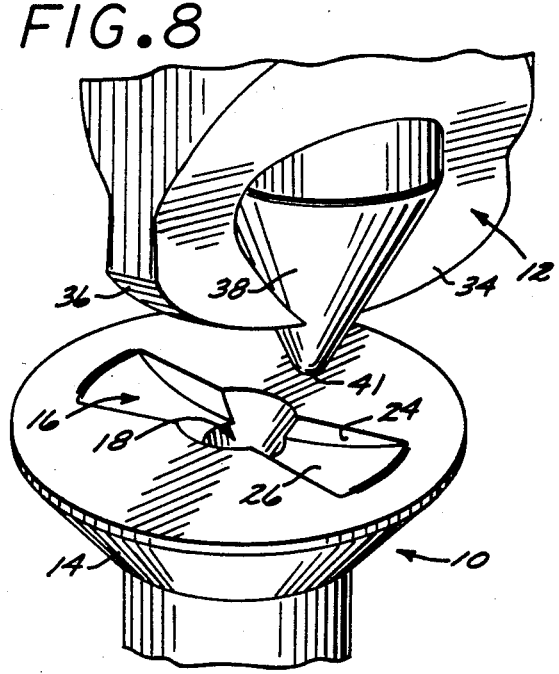
FIG. 8 is a fragmented perspective view similar to FIG. 1 and illustrating initial misalignment between the fastener and driving tool.

As shown in the exemplary drawings, an improved high torque fastener referred to generally by the reference numeral 10 is provided for reception of and engagement by a matingly shaped driving tool 12. The fastener 10 has a head 14 in which is formed an elongated driving slot 16 which combines with a centrally positioned conical recess 18 for facilitating centered, aligned engagement with the driving tool 12 of complementary shape. Once engaged, the particular geometries of the driving tool 12 and the fastener driving slot 16 permit transfer of relatively high torque between the driving tool 12 and fastener 10.

The improved high torque fastener 10 and driving tool 12 of this invention improve upon high torque fasteners of the type described in U.S. Pat. Nos. 2,677,985 and 3,540,342, particularly with respect to initial centering and alignment for driving engagement between the fastener 10 and driving tool 12. More specifically, the present invention permits the driving tool to be centered on and engaged with the driving slot 16 of the fastener 10 quickly and easily and in a manner which can be detected without direct visual inspection by the driving tool operator. The positively engaged fastener 10 and driving tool 12 thus significantly enhance smooth fastener driving while reducing or eliminating instances of lateral movement or "walking" of the driving tool across the fastener and adjacent structural surfaces, which otherwise result in possible damage thereto. Moreover, the centered engagement between the fastener 10 and driving tool 12 results in a generally uniform distribution of driving forces applied subsequently to the fastener thereby preventing application of excessive forces to localized areas which could otherwise damage the fastener.

More particularly, as shown best in FIGS. 1-4, the preferred geometry for the fastener 10 for use in a high torque environment includes a shank 20 which may be appropriately threaded adjacent one end (not shown) and formed integrally at its opposite end with the head 14 commonly to have a tapered, truncated, conical surface expanding radially about a shank centerline axis 21 and terminating in a driving face 22 presented in an axially outboard direction for engagement with the driving tool 12. This illustrative driving face 22 of the head 14 is defined by a generally planar surface interrupted by the driving slot 16 formed therein with a generally bow-tie shaped configuration centered on the fastener central axis 21. This driving slot 16 is defined by a pair of generally upstanding but slightly undercut side walls 24 cooperating with an arcuately concave bottom wall 26 which blends smoothly with the planar head face 22 near the periphery at opposite sides thereof. As viewed best in FIG. 2, the undercut side walls 24 are tapered to provide the slot 16 with a generally bow-tie shaped configuration having a relatively narrow width near the center thereof which progressively increases toward opposite ends of the slot. In addition, the arcuate bottom wall 26 is shaped for smooth curvature from a maximum depth generally at the slot center.

The improved fastener 10 of this invention includes a centering and alignment recess 18 of generally conical shape formed in the head 14 at a position centered on the driving slot 16 and the central axis 21. This conical recess 18 is shaped to have a base diameter 28 lying generally coplanar with the planar surface of the face 21, wherein this base diameter is sized substantially greater than the width of the driving slot near the center thereof, being approximately equal to the width of the wider opposite ends of the driving slot when used with a slot 16 of bow-tie shape as shown. From this base diameter 28, the conical recess 18 extends into the fastener head 14 with a substantial taper and terminates in a substantially pointed apex 30 positioned substantially deeper than the maximum depth of the slot bottom wall 26. To achieve the desired substantial taper to the conical recess 18 yet provide the recess with sufficient depth for centering purposes, as will be described, without requiring excessive removal of fastener head material in the vicinity of the head-to-shank juncture which would unduly compromise fastener strength, the apex 30 has a cross-sectional size of substantially less than the cross-sectional size of the driving slot 16 at the center thereof. Moreover, the depth of the apex 30 within the fastener head is limited to a depth of about twice the central depth of the slot 16, thereby insuring presence of substantial head material at the conical head-to-shank juncture.

The improved driving tool 12 for use with the thus-described fastener 10 includes a blade end for driving reception into the driving slot 16 and conical recess 18 of the fastener 10. More particularly, as shown best in FIGS. 1 and 5-7, the driving tool 12 comprises a tool shaft 32 reduced in thickness at one end to define a diametrically oriented blade 34 defined by opposed side walls separated by a width at least slightly less than the narrow width of the driving slot 16 in the fastener. In the preferred form for high torque applications, these side walls are spaced apart at their lower ends by a spacing slightly less than the narrow slot width and taper slightly toward each other to roughly match the undercut taper of the slot side walls 24. The blade 34 further includes a convexly contoured lower surface 36 formed on a radius of curvature generally matching the radius of curvature of the slot bottom wall 26.

A centrally disposed conical tip 38 is formed on the blade 34 to extend from a base diameter 40 located above the blade lower surface 36 to a generally pointed lower end or apex 41 projecting downwardly beyond the convex surface 36. Importantly, this conical tip 38 is dimensioned for generally mating reception with the conical recess 18 in the fastener head 14, whereby the lower end 41 of the tip 38 projects downwardly beyond the blade lower surface 36 by a distance generally corresponding with the depth by which the recess apex 30 exceeds the maximum depth of the driving slot 16. Similarly, to insure seating of the conical tip 38 into the recess 18, the base diameter 40 of the conical tip 38 is spaced from the blade lower surface 36 by a distance at least as great as the spacing between said surface 36 and the apex 41. Conveniently, the upper end of the conical tip 38 may be structurally reinforced by a generally cylindrical support segment 42 extending upwardly from the tip base diameter 40 and blending smoothly with the opposite side walls of the tool blade.

With this construction, the relatively pointed end 41 of the conical tip 38 provides a relatively small surface area for initial contact with the head 14 of the fastener in the event the tip end 41 initially contacts the fastener at any position other than within the conical recess 18. This relatively small surface contact area is easily detected by the tool operator by "feel" without requiring direct visual inspection, since the tool 12 is thereby prevented from achieving a stable position seated against the fastener head. The tool operator thereby knows that tool position must be adjusted further until the tip end 41 drops into and seats within the conical recess 18 to position the tool in a coaxially centered and aligned relation with the central axis 21 of the fastener before rotational driving of the tool. Such seating motion of the tip end 41 into the recess 18 is readily perceived and felt by the tool operator who can then with confidence initiate tool rotation either manually or by power-driven means (not shown) to rotate the fastener for installation purposes.

More particularly, with specific reference to FIGS. 8-11, initial contact of the tip end 41 with the planar surface 22 of the fastener head 14 maintains the lower surface 36 of the blade 34 in spaced relation above the fastener. As a result, broad surface contact between the tool 12 and the fastener 10 is prevented thereby providing the tool operator with a readily perceivable "feel" indicating that the tool blade is not properly seated or aligned. Subsequent adjustment of the tool position is then continued until the tip end 41 drops into the driving slot 16 or the conical recess 18. Initial dropping into the driving slot 16, however, brings the tip end 41 into substantially unstable point surface contact with the bottom wall 26 of the slot due to the relative size of the tip end 41 with respect to the slot depth. Advantageously, the curved geometry of the slot bottom wall 26 guides the tip end 41 toward a central seated position within the conical recess 18.

Figure 9:
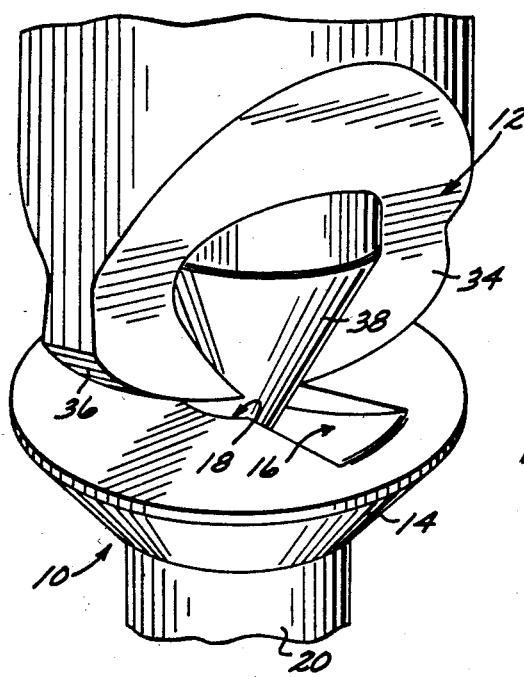
FIG. 9 is a fragmented perspective view similar to FIG. 8 and illustrating centered alignment and partial engagement between the fastener and driving tool.
Figure 10:
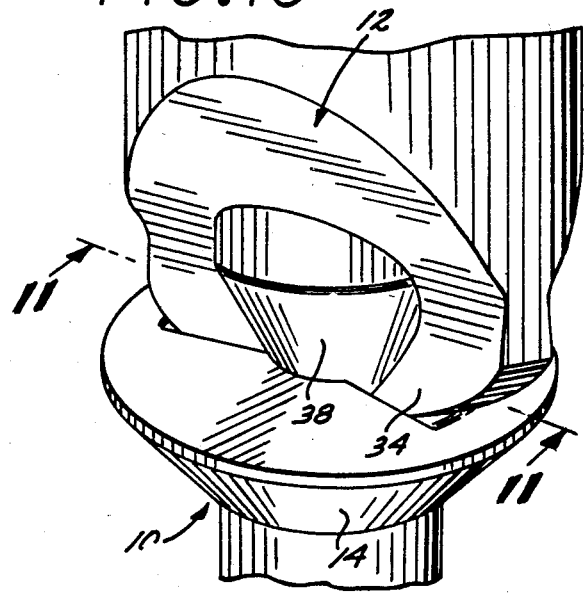
FIG. 10 is a fragmented perspective view illustrating full engagement between the fastener and driving tool.
Figure 11:
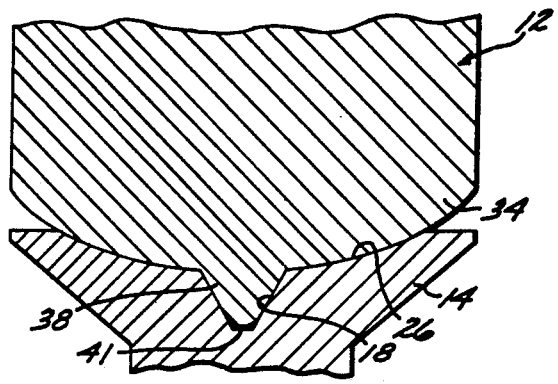
FIG. 11 is a fragmented vertical section taken generally on the line 11—11 of FIG. 10.

In most instances, upon initial seated reception of the tip end 41 into the conical recess 18, the arcuately convex tool blade 34 will be angularly misaligned relative to the driving slot 16 in the fastener, as viewed in FIG. 9. However, in this position, the partial reception of the conical tip 38 into the recess 18 still results in a stable "feel" detectable by the tool operator who then begins rotation of the driving tool bringing the blade 34 into alignment with the driving slot 16, whereupon the blade 34 drops into engagement within the slot 16 seated upon the slot bottom wall, as viewed in FIG. 10. Importantly, during this initial rotation, lateral displacement of the tool 12 relative to the fastener in any direction is substantially prevented by the centered partial reception of the tip 38 in the recess 18. Once seated within the driving slot of course, tool rotation can be continued as required to smoothly advance and install the fastener, with the tool applying appropriate rotational forces thereto with substantially uniform distribution, and substantially without transfer of rotational driving forces by the conical end tip 41.

The improved fastener 10 and driving tool 12 of this invention thus permit rapid and accurate centering engagement between the fastener and tool which can be accomplished entirely by "feel" in the absence of direct visual inspection. Once engaged, the cooperating surface of the fastener and tool permit transfer of relatively high torque forces therebetween while maintaining those forces with equal distribution as applied to the fastener 10 thereby insuring uniform and relatively smooth fastener driving with minimum risk of damage to the head 14 thereof.

Figure 12:
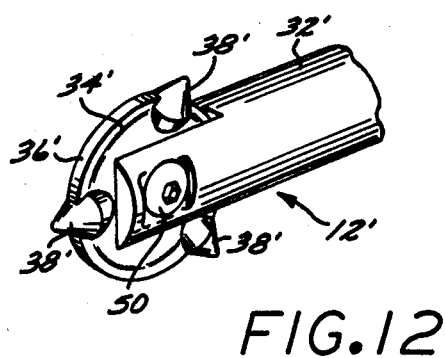
FIG. 12 is a fragmented perspective view illustrating an alternative preferred form of a driving tool embodying the novel features of the invention.

According to one alternative form of the invention, as viewed in FIG. 12, a modified driving tool 12' may be provided including an adjustable blade wheel 34' secured by a set screw 50 or the like into the forked end of a tool shaft 32' which may be driven manually or by power means (not shown), as described. The blade wheel 34' has an arcuately convex periphery 36' with a curvature generally matching that of the driving slot 16 in the fastener 10, as described, for example, with respect to FIGS. 1-4. In addition, the blade wheel 34' includes a plurality of generally conical blade tips 38' formed about the periphery thereof with appropriate sizes and shapes for mating reception into the central conical recess 18 of the fastener 10. Accordingly, as illustrated in FIG. 12, engagement and driving of the fastener using one of the conical tips 38' and adjacent regions of the periphery 36' may be continued until wear thereof exceeds an unacceptable degree. At such time, removal of the set screw 50 will permit removal and rotation of the blade wheel 36' prior to reinstallation onto the shaft 32' in a position presenting a new conical tip 38' for engagement with subsequent fasteners.

Figure 13:
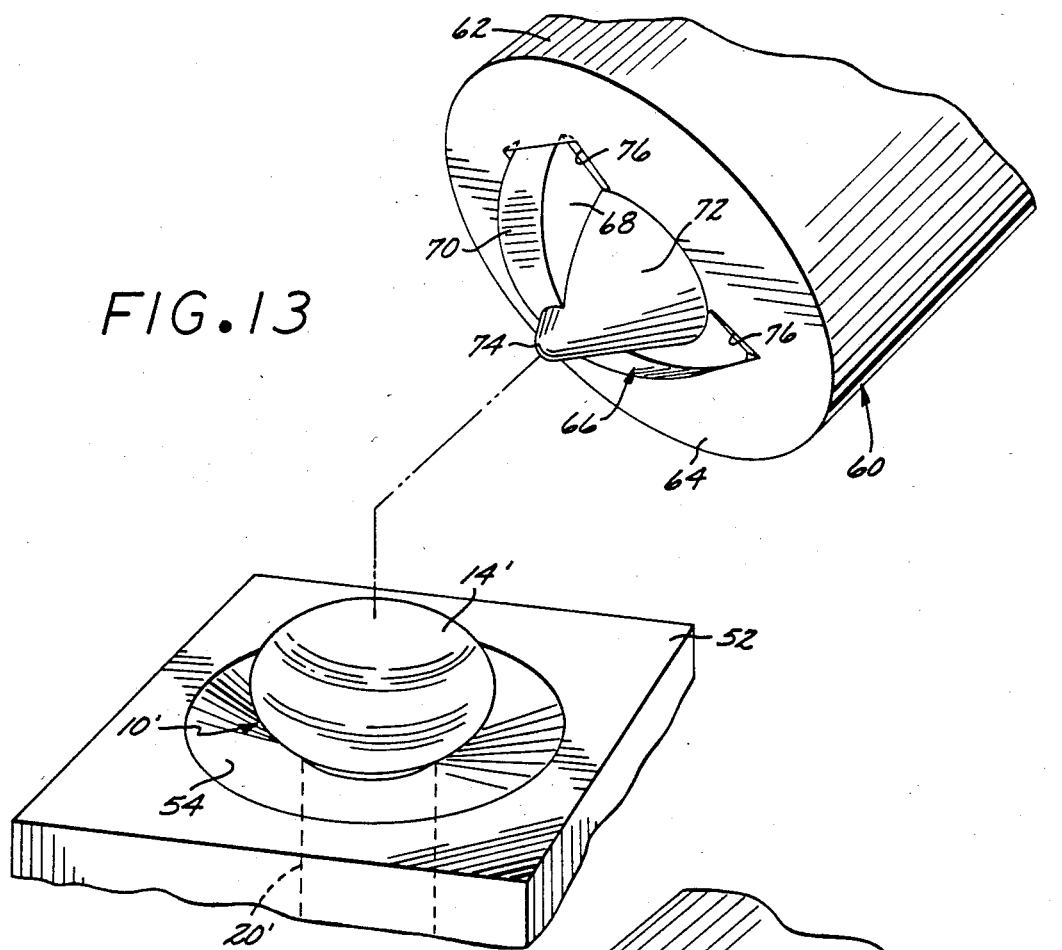
FIG. 13 is a fragmented exploded perspective view illustrating a first step in a two-step heading process for forming the improved fastener.
Figure 14:
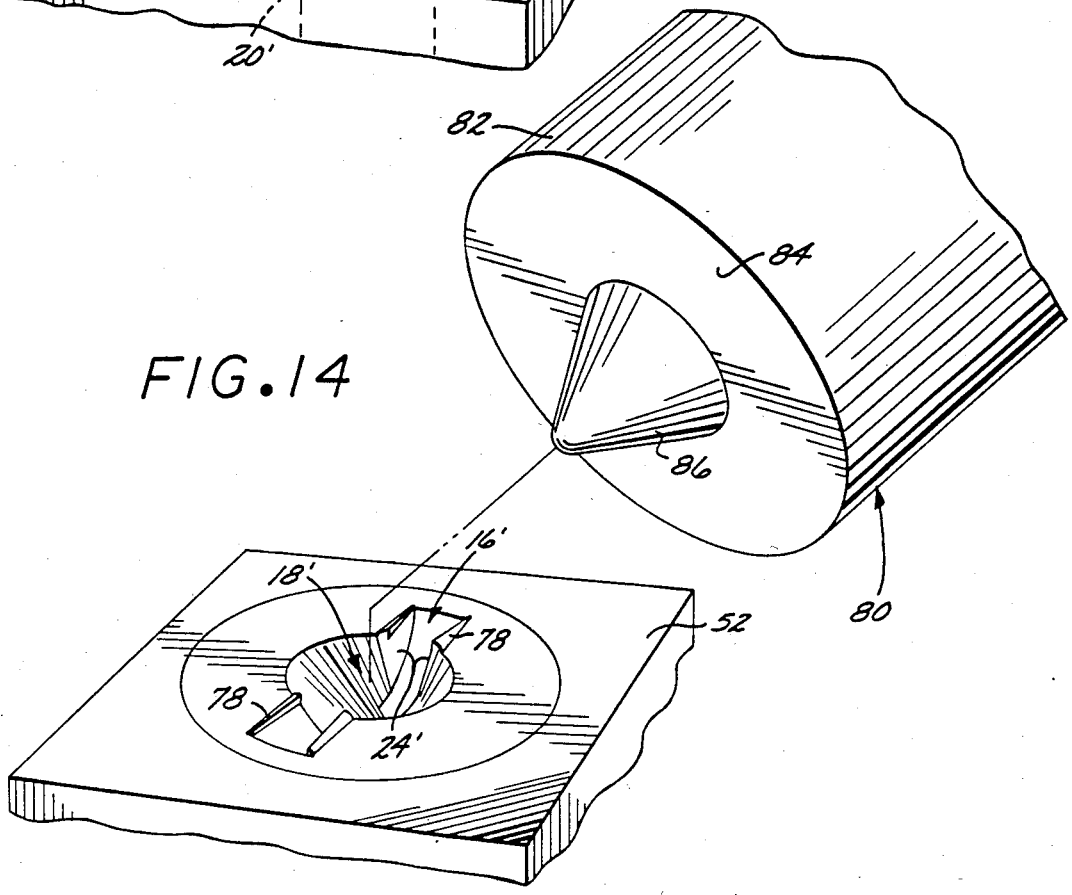
FIG. 14 is a fragmented exploded perspective view illustrating a second step in the two-step heading process.

According to further features of the present invention, the fastener 10 described in detail with respect to FIGS. 1-4 can be formed quickly and easily by a two-step heading process, as illustrated in FIGS. 13 and 14. More particularly, with reference to FIG. 13, a fastener preform 10' having a blank head 14' and a shank 20' may be supported within an appropriate die 52 with the blank had 14' consisting of a bulge of material disposed within a conical depression 54 at the top of the die.

The thus-supported blank head 14' is impacted by a first hammer 60 which includes a cylindrical body 62 having a planar face 64 at one end which has a centrally formed specifically configured structure for shaping the blank head. This shaping structure consists of a blade portion 66 centered diametrically on the hammer and defined by opposed parallel side walls 68 and an arcuately convex lower surface 70. This blade portion blends with a central conical tip 72 extending from the planar surface 64 toward a relatively pointed apex end 74 projecting beyond the arcuate surface 70. In addition, relatively shallow channels are formed in the planar surface 64 alongside the blade portion side walls 68, wherein these channels 76 extend with decreasing width and depth away from the conical tip 74.

Initial impact of the blank head 14' with the first hammer 60 deforms the blank head to the intermediate configuration shown in FIG. 14. As illustrated, the blank head is deformed into the die depression 54 and includes an upwardly open central conical recess 18' in combination with an arcuately convex slot 16'. At this stage of manufacture, the opposed side walls 24' of the slot 16' are generally in parallel with one another and are lined at their upper extents by relatively small ridges 78 of material. These ridges 78 correspond with the channels 76 in the first hammer 60 and thereby extend from the base diameter of the recess 18' with decreasing height and thickness toward the ends of the slot 16'.

The above-described partially formed fastener head is then impacted with a second hammer 80 shown in FIG. 14 to include a cylindrical body 82 with a planar face 84 at one end interrupted by a central conical tip 86. This conical tip 86 corresponds in size and shape with the desired final configuration of the conical recess 18 in the fastener head 14 (FIG. 1). Importantly, impact of this conical tip 86 in combination with the planar surface 84 of the second hammer 80 deforms the upstanding ridges 78 downwardly in cooperation with the side walls of the arcuately concave slot to provide those side walls with a generally bow-tie shaped configuration with a slight undercut diminishing in magnitude in directions away from the conical recess. Accordingly, subsequent to impact with the second hammer 80, the fastener 10 assumes the configuration described with respect to FIGS. 1-4.

A variety of further modifications and improvements to the invention described herein are believed to be apparent to one of ordinary skill in the art. Accordingly, no limitation on the invention is intended, except by way of the appended claims.

What is claimed is:

1. A driving tool for use in combination and relatively high torque engagement with a high torque fastener having a head at one end of a threaded shank and said head defining a driving face presented in an axially outboard direction, said driving face including a recessed driving slot of generally bow-tie shaped configuration defined by at least slightly undercut side walls and an arcuately concave bottom wall centered generally on the longitudinal axis of said shank, and a generally conical recess centered generally on the driving slot with a base diameter substantially greater than the central width of the driving slot and on the order of the width of the driving slot at the opposite ends thereof, and an apex disposed within said head at a depth generally twice the maximum depth of said driving slot bottom wall, comprising:

a tool shaft;

a driving blade at one end of said tool shaft in a position centered generally on a longitudinal axis of said shaft and defined by a pair of side walls, said blade having a width at least slightly less than the central width of said driving slot and an arcuately convex lower surface presented in an axially outboard direction for engagement with the concave bottom wall of said fastener driving slot; and a generally conical blade tip formed on said driving blade in a position generally centered on said tool shaft longitudinal axis, said blade tip having a base diameter blending relatively smoothly with said blade side walls at a position spaced inboard relative to said convex lower surface and a generally pointed end apex projecting axially a substantial distance beyond said blade convex lower surface, said blade tip being sized for generally mating reception into said fastener conical recess when said driving blade convex lower surface is seated upon said driving slot bottom wall.

2. The driving tool of claim 1 wherein said blade is formed integrally with said tool shaft.

3. The driving tool of claim 1 wherein said blade is removably mounted on said tool shaft.

4. The driving tool of claim 3 wherein said blade comprises a blade wheel removably mounted on said tool shaft in a position with a diameter of said wheel aligned generally with said shaft longitudinal axis, said blade wheel having a plurality of said blade tips formed about the circumference.

5. The driving tool of claim 1 wherein said blade side walls are formed to extend from said lower surface in an axially inboard direction with a slight taper extending toward each other.

6. The driving tool of claim 1 wherein said base diameter of said blade tip is spaced from said blade lower surface by a distance at least as great as the spacing between said pointed end apex and said blade lower surface.

7. For use in combination with a high torque fastener having an elongated shank and a head at one end of the shank, the head including an axially outboard-presented driving face defined by an elongated driving slot of generally bow-tie shaped configuration centered generally on a central axis of the fastener and including spaced slightly undercut side walls separated by an arcuately concave bottom wall, and further including a generally conical recess centered generally on the driving face with a base diameter substantially greater than a central width of the driving slot and said recess extending into the fastener head from the base diameter with a substantial taper to a substantially pointed end apex at a depth generally about twice the central depth of the driving slot, wherein the apex has a cross-sectional size substantially less than the central width of the driving slot, a driving tool comprising:

a tool shaft carrying a tool blade defined by a pair of side walls and an arcuately convex lower end surface presented in an axially outboard direction and centered generally on a longitudinal axis of said tool shaft, said side walls being spaced apart by a distance at least slightly less than the central width of the fastener driving slot and said convex lower end surface being formed on a radius for generally matching said driving slot bottom wall; and a generally conical blade tip centered on said tool blade and including a substantially pointed end apex spaced in an outboard direction from said blade convex lower end surface by a distance generally corresponding to the fastener conical recess apex when said convex lower end surface is seated within the fastener driving slot and said blade tip apex having a cross-sectional size substantially less than the central width of the blade driving slot, said blade tip further including a base diameter spaced in an inboard direction from said blade convex lower end surface by a distance generally at least as great as the distance between said blade tip apex and said convex lower end surface and having a diametric size substantially greater than the central width of the fastener driving slot.

* * * * *